(12) United States Patent
Erickson et al.

(10) Patent No.: US 7,216,477 B1
(45) Date of Patent: May 15, 2007

(54) METHOD AND APPARATUS FOR A ROCKET ENGINE POWER CYCLE

(75) Inventors: Christopher M Erickson, Thousand Oaks, CA (US); James R Lobitz, Oak Park, CA (US); William Bissell, Westlake Village, CA (US)

(73) Assignee: United Technologies Corporation, Hartford, CT (US)

( * ) Notice: Subject to any disclaimer, the term of this patent is extended or adjusted under 35 U.S.C. 154(b) by 947 days.

(21) Appl. No.: 10/098,955

(22) Filed: Mar. 15, 2002

(51) Int. Cl.
*F02K 9/46* (2006.01)
*F02K 9/64* (2006.01)

(52) U.S. Cl. .............................. 60/259; 60/260; 60/266

(58) Field of Classification Search .................. 60/259, 60/260, 266, 267
See application file for complete search history.

(56) References Cited

U.S. PATENT DOCUMENTS

| | | | |
|---|---|---|---|
| 2,900,168 A | 8/1959 | Nyborg | |
| 3,049,870 A | 8/1962 | Chamberlain | |
| 3,516,254 A | 6/1970 | Hammond | |
| 4,583,362 A | 4/1986 | Wagner | |
| 5,052,176 A | 10/1991 | Labatut et al. | |
| 5,101,622 A | 4/1992 | Bond | |
| 5,410,874 A | 5/1995 | Limerick | |
| 5,444,973 A | 8/1995 | Limerick et al. | |
| 6,052,987 A | 4/2000 | Dressler | |
| 6,769,242 B1 * | 8/2004 | Balepin | 60/266 |

* cited by examiner

*Primary Examiner*—L. J. Casaregola
(74) *Attorney, Agent, or Firm*—Harness Dickey & Pierce P.L.C.

(57) ABSTRACT

A system for cooling a portion of a rocket engine with an inert compound and transferring the thermal energy from the inert compound to the propellants. The energy absorbed by the coolant is used also to power the turbines which powers the pumps that pump the fuel, the oxidizer, and the coolant. Additionally, the coolant, which is an inert compound, is used to separate the oxidizer and the fuel before the oxidizer and the fuel enter the combustion chamber eliminating the need for a complex inert turbo pump seal package. The systems which pump or comprise the coolant physically separate the propellants before the propellants enter the rocket engine. The coolant remains substantially unconsumed in this cycle.

13 Claims, 1 Drawing Sheet

METHOD AND APPARATUS FOR A ROCKET ENGINE POWER CYCLE

FIELD OF THE INVENTION

The present invention relates to spacecraft propulsion systems and, more particularly, to an improved power cycle and cooling system for rocket engines on board spacecraft.

BACKGROUND OF THE INVENTION

As is generally known in the art, a rocket engine provides propulsion to a craft by combusting propellants, such as fuel and an oxidizer, at high pressure. The combustion of the fuel and the oxidizers provide a hot gas which is then expelled through a nozzle at high velocity providing the thrust. Generally, these systems include high pressure and high temperature components which, due to the high pressure and high temperature environments, are highly complex, heavy, and expensive.

Generally, turbines provide power to pumps which pump fuel and the oxidizer to the main combustion chamber of a rocket engine. High pressure gases are required to power the turbines, which in turn power the pumps to feed the propellants. In order to produce such high pressure gases, combustion devices such as pre-burners are provided to initially heat or combust a portion of the propellants. Certain propellants may be used to cool the main combustion chamber and thereby transfer the high pressure and high temperature gases to power the turbo pumps. This, however, requires an additional supply of propellants to power the turbines and cool the combustion chamber.

Regardless, it is generally known to power the turbines with high pressure and high temperature gases. As such, the turbines themselves must be able to withstand such high pressures and temperatures to perform properly in these environments. Additionally, several seals must be used to ensure that the oxidizers and fuels do not mix before entering the main combustion chamber. Such a pre-mixture may produce a failure of the system. Generally, the seals are purged with an inert or tertiary gas which is consumed in the seal as it flows through to ensure that the oxidizer and fuel do not mix.

SUMMARY OF THE INVENTION

The present invention is directed to a power cycle that provides cooling to a rocket engine and provides energy to a power plant with a recycled inert tertiary fluid. The cooling system transports a coolant that cools the combustion chamber and a section of the exhaust nozzle of a rocket engine. A portion of the energy extracted in the cooling circuits is used to power a turbine driving the pumps of the system. This eliminates the need for pre-burners to power the turbines. A heat exchanger is then used to cool and condense the fluid to allow pumping back to pressure. This is done by heating the incoming oxidizer. By using an inert drive fluid, the need for a complex and costly inter-propellant seal on the turbo pump is eliminated.

A first preferred embodiment of the power cycle with heat exchanger cooling system includes a system for providing an oxidizer and a fuel to a rocket engine. The system comprises an engine, a fuel supply system comprising a fuel pump adapted to pump a fuel to the engine, an oxidizer supply system adapted to pump an oxidizer to the engine, and a coolant supply system adapted to pump a coolant to the engine. The coolant supply system transports the coolant adjacent the engine such that the coolant receives energy from the engine. Also, the coolant transfers energy to the oxidizer before the oxidizer enters the engine.

A second preferred embodiment of the present invention is a system for cooling and providing an oxidizer and a fuel to a engine of a rocket engine. The system comprises an oxidizer supply system, wherein the oxidizer supply system supplies the oxidizer to the engine. The system also includes a cooling system, wherein the cooling system cools the engine. The cooling system provides energy to the oxidizer supply system.

The new system of the present invention also allows a unique method of operating a rocket engine wherein a fuel and an oxidizer are provided to the rocket engine at a low pressure. The method includes pumping a cool coolant through a cooling jacket of the rocket engine. In this manner, the cool coolant absorbs a portion of the heat generated by the engine and is thus converted into a hot coolant after cooling the rocket engine. The hot coolant powers a power plant by transferring a first portion of the energy from the hot coolant to the power plant. The hot coolant then cools back into a cool state to be reused. The hot coolant also converts a cool oxidizer to a hot oxidizer by transferring a second portion of the energy from the hot coolant to the oxidizer. The hot oxidizer is then directed to the engine.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT(S)

Figure 1:
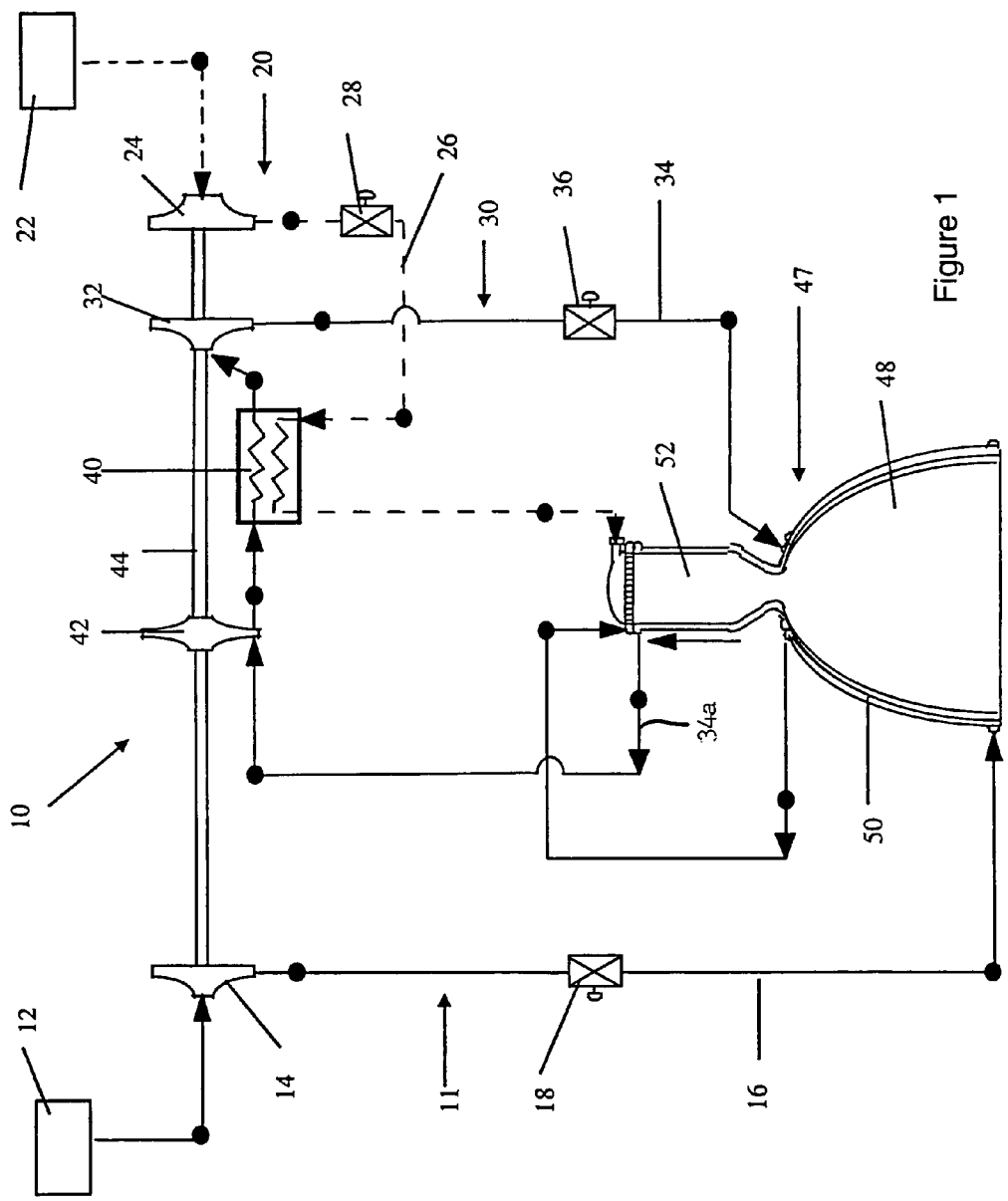
FIG. 1 is a diagrammatic view of a preferred embodiment of the present invention.

The following description of the preferred embodiment(s) is merely exemplary in nature and is in no way intended to limit the invention, its application, or uses.

With reference to FIG. 1, a diagram of an expander heat exchanger cycle system ("Ex-Hex" system) 10 according to a preferred embodiment of the present invention is shown. The Ex-Hex system 10 is used to provide a low pressure and low temperature system to provide power propellants to a rocket engine. A fuel system 11 includes a fuel supply 12 which provides a fuel, one particular propellant, to the Ex-Hex system 10. The fuel provided from the fuel supply 12 may supply any fuel generally used in rocket engines, such as kerosene. The fuel supply system further comprises a fuel pump 14 and at least one fuel transport line 16 which include at least one valve 18. An oxidizer supply system 20 includes an oxidizer supply 22, forming a second propellant, which may comprise any appropriate oxidizer, such as oxygen. The oxidizer supply system 20 further comprises an oxidizer pump 24 which pumps the oxidizer through at least one oxidizer transport line 26, which includes a valve 28, into the Ex-Hex system 10. A coolant supply system 30 comprises coolant pump 32 which pumps coolant through at least one coolant line 34, which includes a valve 36. Both the oxidizer supply line 26 and the coolant supply line 34 go through a heat exchanger 40, described more fully herein. A turbine 42 is provided on a drive axle 44 which interconnects the turbine 42 with each of the pumps 14, 24 and 32. When the turbine 42 is powered, it rotates the drive axle 44 and drives each of the pumps 14, 24 and 32 simultaneously. Therefore, the single turbine 42 powers each of the pumps 14, 24 and 32.

Each of the three compounds comprising the fuel, the coolant, and the oxidizer at some point engage an engine 47 which includes a nozzle 48. The nozzle 48 is surrounded by a cooling jacket 50 which includes channels where the different components may flow, as described further herein. Extending from the nozzle 48, and also a portion of the engine 47, is a combustion chamber 52. The combustion chamber 52 receives the fuel and the oxidizer to be combusted and then expels the combusted gases through the nozzle 48. When the gases are expelled through the nozzle 48 they provide the thrust to the system. The cooling jacket 50 may also surround the combustion chamber 52 to cool the combustion chamber as well.

During operation of the Ex-Hex system 10, the fuel leaves the fuel pump 14 and enters the fuel line 16 at a pressure generally between about 3000 and 4000 absolute pounds per square inch (psia), wherein the pressure per square inch is measured relative to a complete vacuum, and a temperature between about 520 degrees Rankin (° R) and about 600 degrees Rankin (° R) (about 60° F. and about 140° F. or about 15° C. and about 60° C.). The fuel then travels through the fuel line 16 to the nozzle 48 and travels through the cooling jacket 50 cooling the nozzle 48 as it travels through the cooling jacket 50. After exiting the cooling jacket 50, the fuel has dropped in pressure to generally between about 2500 and the 3500 psia and increased in temperature to between about 600° R and about 760° R (about 141° F. and about 301° F. or about 60° C. and about 149° C.) before it enters the main combustion chamber 52. This decrease in pressure and increase in temperature indicates a cooling of the nozzle 48, which helps to reduce the stress on the nozzle 48 during combustion.

The heat exchanger 40 transfers heat and energy from the coolant lines 34 to the oxidizer lines 26, as described further herein. The energy transferred from the coolant lines 34 is gathered at the combustion chamber 52. This helps cool the combustion chamber 52 and increases the temperature of the oxidizer. This process begins when the coolant exits the coolant pump 32 at a pressure of between about 3500 and 4500 psia and at a temperature of between about 120° R to about 270° R (about −339° F. and about −189° F., or about −206° C. and about −123° C.), wherein the coolant is viewed as a cool coolant. The coolant, after initially exiting the coolant pump 32, enters the cooling jacket 50 of the engine 47. The coolant then increases in temperature, indicating it has gained energy, comprising thermal energy, while decreasing in pressure as it cools the engine 47. The coolant evaporates into a gas, or simply increases temperature, at this point and exits the cooling jacket 50 near the combustion chamber 52 and re-enters the coolant lines 34.

As the coolant exits the cooling jacket 50 near adjacent the combustion chamber 52, it has a pressure of approximately between 2500 and 3200 psia while having a temperature of between about 800 and 1000 degrees R (about 341° F. and about 541° F., or about 171° C. and about 282° C.) and is now a hot coolant. The hot coolant continues along Portion 34a of the coolant line 34 and enters the turbine 42, to power the turbine 42, which in turn powers each pump 14, 24, and 32. After depleting some of its energy, the hot coolant exits the turbine 42 at a pressure between about 280 and about 390 psia and a temperature of between about 500° R and about 700° R (about 41° F. and about 241° F., or about 4° C. and about 115° C.). The hot coolant then enters the heat exchanger 40 to transfer a further portion of energy to the heat exchanger 40. After exiting the heat exchanger 40, the coolant has a pressure between about 180 and 280 psia and a temperature between about 150° R and about 250° R (about −309° F. and about −209° F., or about −189° C. and about −134° C.). The coolant has now returned to a cool state again. The coolant is then pumped back into the coolant line 34 to re-circulate. In this way, the coolant is never depleted in the Ex-Hex system 10.

The hot coolant then enters the heat exchanger 40 to transfer a further portion of energy to the heat exchanger 40. After exiting the heat exchanger 40, the coolant has a pressure between about 180 and 280 psia and a temperature between about 150° R and about 25° R (about −309° F. and about −209° F., or about −189° C. and about −134° C.). The coolant has now returned to a cool state again. The coolant is then pumped back into the coolant line 34 by coolant pump 32 to re-circulate. In this way, the coolant is never depleted in the Ex-Hex system 10.

The coolant continually cools the engine 47 and then is cooled and condensed while transferring most of its accumulated heat energy to the turbine 42 and the heat exchanger 40. These transfers of energy from the hot coolant condense or re-cool the coolant.

The oxidizer pump 24 pumps oxidizer at an initial pressure of between about 2500 and 3500 psia and an initial temperature between about 115° R and about 215° R (about −34° F. and about −244° F., or about −209° C. and about −153° C.) so that the oxidizer may be viewed as a cool oxidizer. The oxidizer is initially pumped to the heat exchanger 40 where it gains some of the heat energy released by the hot coolant as the hot coolant passes through the heat exchanger 40. Therefore, the heat exchanger 40 transfers energy between the hot coolant and the cool oxidizer. After leaving the heat exchanger 40, the oxidizer has become a hot oxidizer and has a pressure of between about 2500 and 3200 psia and a temperature between about 220° R and about 300° R (about −239° and about −159° F., or about −150° C. and about −106° C.). The hot oxidizer then feeds into the combustion chamber 52 where it oxidizes the fuel to produce the necessary expanding gases to provide thrust.

The heat exchanger 40 allows the oxidizer to increase in temperature enhancing combustion efficiency in the combustion chamber 52. The coolant in the Ex-Hex system 10, which first gains heat and energy by cooling the engine 47, then transfers that heat and energy first to the turbine 42 to power the pumps 14, 24, and 32, and then transfers additional energy to the oxidizer through the heat exchanger 40. Therefore, the coolant in the Ex-Hex system 10 heats the oxidizer.

Placing the coolant pump 32 and the turbine 42, both containing coolant, which is an inert compound, between the fuel pump 14 and the oxidizer pump 24 ensures that the fuel and the oxidizer never mix before entering the combustion chamber 52. Because the coolant provides the energy to the oxidizer through the heat exchanger 40, this helps ensure that the oxidizer and the fuel do not mix before entering the combustion chamber 52. Reducing the number of times the oxidizer and the fuel mix before entering the combustion chamber 52 helps to increase the longevity and simplicity of the Ex-Hex system 10.

It will be understood that any appropriate heat exchanging system may be used as the heat exchanger 40 in the Ex-Hex system 10. Because the oxidizer is heated with the heat exchanger 40, the Ex-Hex system 10 need only provide fuel to the combustion chamber 52. Also, since the oxidizer does not enter the heat exchanger 40 at a high pressure or temperature, the heat exchanger 40 may be of a relatively simple design and formed from components that need not be designed to resist extremely high pressures and temperatures. Also, since fuel does not enter the heat exchanger 40, the heat exchanger 40 need not be reinforced because no combustion should occur within the heat exchanger.

It will be appreciated that the coolant is the only compound which enters the Ex-Hex system 10 at a particularly high pressure. The coolant may be any inert compound, such as nitrogen. Because nitrogen, or any other inert coolant, is a relatively inert compound, the coolant pump 32 need not be a complex system which is needed to ensure that a more corrosive or explosive compound does not escape. Therefore, having an inert compound as the high pressure compound in the Ex-Hex system 10 reduces the complexity and cost of the pumps.

It will also be understood that the Ex-Hex system 10, by using an inert coolant to cool the engine 47 or any portion thereof, such as the nozzle 48 alone, along with a heat exchanger 40 to transfer that energy to the other compounds needed in the combustion chamber 52, may be implemented on any rocket engine which requires that the components be heated to a specific temperature to combust properly. Therefore, with only simple augmentation, the present invention may be applied to numerous rocket engine designs which require heated fuels and/or oxidizers to power the combustion chambers thereof.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A system for providing an oxidizer and a fuel to a combustion chamber of a rocket engine, comprising:
    an engine;
    a fuel supply system comprising a fuel pump adapted to pump a fuel to said engine;
    an oxidizer supply system adapted to pump an oxidizer to said engine, including:
        an oxidizer pump; and
        at least one oxidizer transport line, wherein the oxidizer is pumped through said oxidizer transport line and through a coolant system heat exchanger to gain energy before entering said engine;
    a coolant supply system adapted to pump a coolant to said engine, including:
        a coolant pump;
        a heat exchanger; and
        at least one coolant transport line, wherein the coolant is pumped through said coolant transport line to said engine to transfer heat from said engine to said heat exchanger; and
    a heat transfer system operable to transfer energy from the coolant to the oxidizer before the oxidizer enters said combustion chamber of said engine;
    a power source for providing power to each of said coolant pump, said oxidizer pump, and said fuel pump;
    wherein said coolant supply system transports the coolant adjacent a portion of said engine such that the coolant is in thermal contact with said portion of said engine and thus receives energy from said engine;
    wherein said power source is powered by a transfer of energy from the coolant to the power source.

2. The system of claim 1, wherein the coolant comprises nitrogen.

3. The system of claim 1, wherein a cooling pump of said coolant supply system is located within said system to inhibit mixing of said fuel and said oxidizer before said fuel and said oxidizer enter said combustion chamber.

4. A system for cooling and providing an oxidizer and a fuel to a rocket engine, comprising:
    an oxidizer supply system, wherein said oxidizer supply system supplies the oxidizer to the engine;
    a cooling system operable to transfer thermal energy from the rocket engine to the oxidizer supply system;
    a fuel supply system for providing the fuel to the engine; and
    a power plant, wherein said power plant powers each of said fuel supply system, said oxidizer supply system, and said cooling system, and wherein said power plant is powered by energy received from said cooling system.

5. The system of claim 4, further comprising:
    a heat exchanger;
    wherein said cooling system comprises a first pump and coolant transport lines to move the coolant;
    wherein said oxidizer supply system comprises a second pump and oxidizer transport lines to move the oxidizer;
    wherein the coolant moved in said coolant transport lines receives thermal energy from the engine as the coolant is pumped in thermal contact with a portion of the engine; and
    wherein the coolant transfers a first portion of the thermal energy absorbed to the power plant and the coolant transfers a second portion of the thermal energy to the heat exchanger.

6. The system of claim 4, wherein said cooling system moves an inert compound; and
    wherein said cooling system includes a pump that is located relative to said fuel supply system and said oxidizer supply system, to prevent mixing of said fuel and said oxidizer before said fuel and said oxidizer reach said engine before the fuel and the oxidizer enter the engine.

7. The system of claim 4, further comprising a heat exchanger; and
    wherein said cooling system transfers energy to said oxidizer supply through said heat exchanger.

8. A system for providing an oxidizer and a fuel to a combustion chamber of a rocket engine, comprising:
    an engine;
    a fuel supply system comprising a fuel pump adapted to pump a fuel to said engine;
    an oxidizer supply system comprising an oxidizer pump adapted to pump an oxidizer to said engine;
    a coolant supply system comprising a coolant pump adapted to pump a coolant to said engine;
    a power plant to provide power to each of said fuel pump, said oxidizer pump, and said coolant pump;
    wherein said coolant supply system transports the coolant adjacent a portion of said engine such that the coolant is in thermal contact with said portion of said engine and thus receives energy from said engine; and
    wherein the coolant transfers energy to said power plant, to provide power to said power plant.

9. The system of claim 8, wherein said coolant transfers energy to said oxidizer such that said coolant returns to a liquid state.

10. The system of claim 8, wherein said coolant supply system includes a pump, the pump being located relative to the fuel supply system and the oxidizer supply system to preventing mixing of said fuel and said oxidizer prior to said fuel and said oxidizer entering said engine.

11. A system for a chemical rocket engine, comprising:
   at least one of a combustion chamber, a nozzle, or combinations thereof;
   an oxidizer supply system operable to supply an oxidizer to the at least one of a combustion chamber, a nozzle, or combinations thereof; and
   a cooling system having a cooling material consisting essentially of nitrogen and operable to transfer thermal energy from the at least one of a combustion chamber, a nozzle, or combinations thereof to the oxidizer supply system.

12. The system of claim 11, wherein the oxidizer supply system includes a power plant and at least one of a state change, an expansion, or combinations thereof of the cooling material powers the power plant.

13. The system of claim 11, further comprising:
   a heat exchanger operable to allow a thermal energy transfer from the coolant material to the oxidizer.

* * * * *